Figure 1:
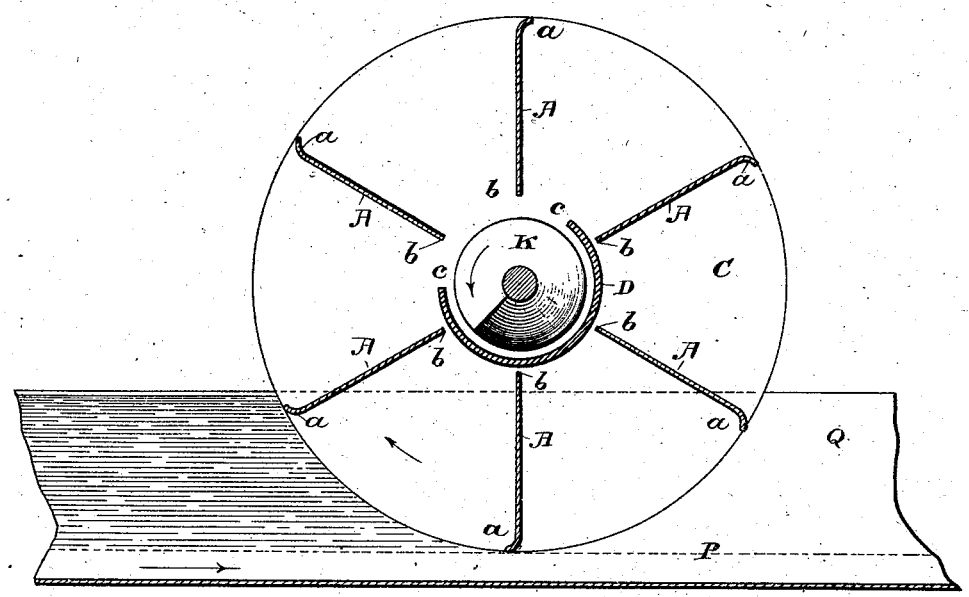

(No Model.) 3 Sheets—Sheet 1.

A. P. MASSEY.
APPARATUS FOR USE IN THE EXTRACTION OF OIL FROM SEEDS, &c.

No. 290,083. Patented Dec. 11, 1883.

ATTEST_
Geo. T. Smallwood
J. Henry Kaiser.

INVENTOR_
Albert P. Massey
by Charles J. Hedrick
his attorney

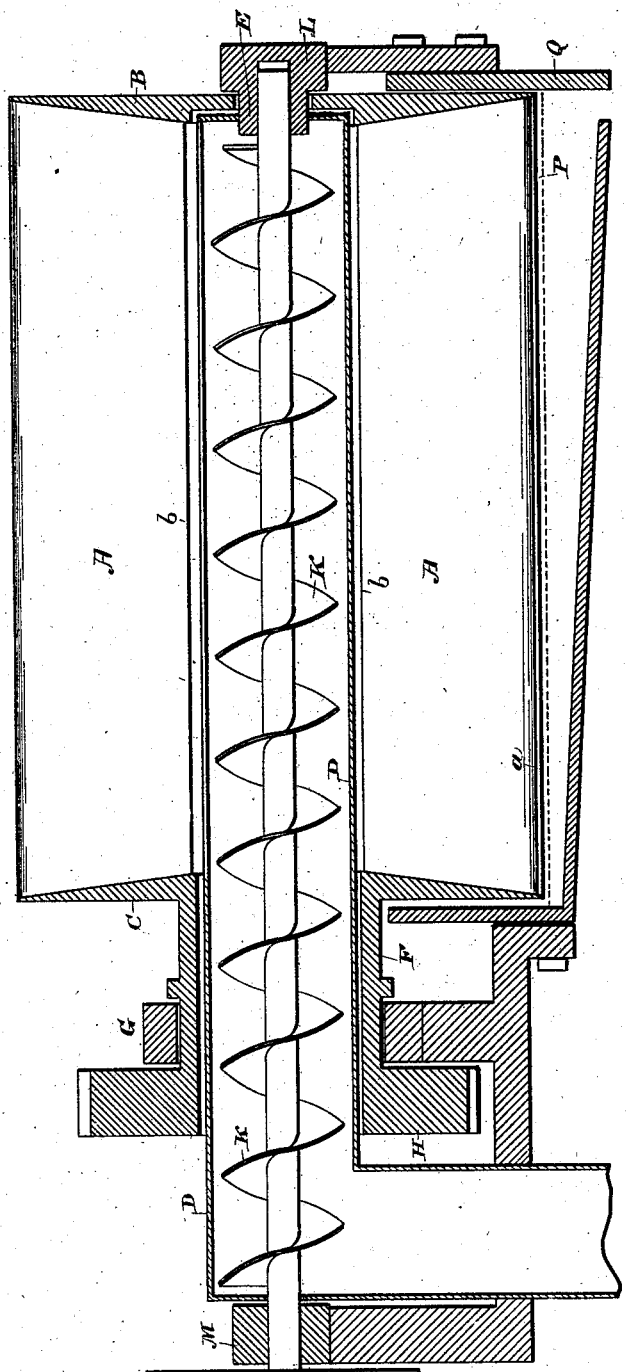

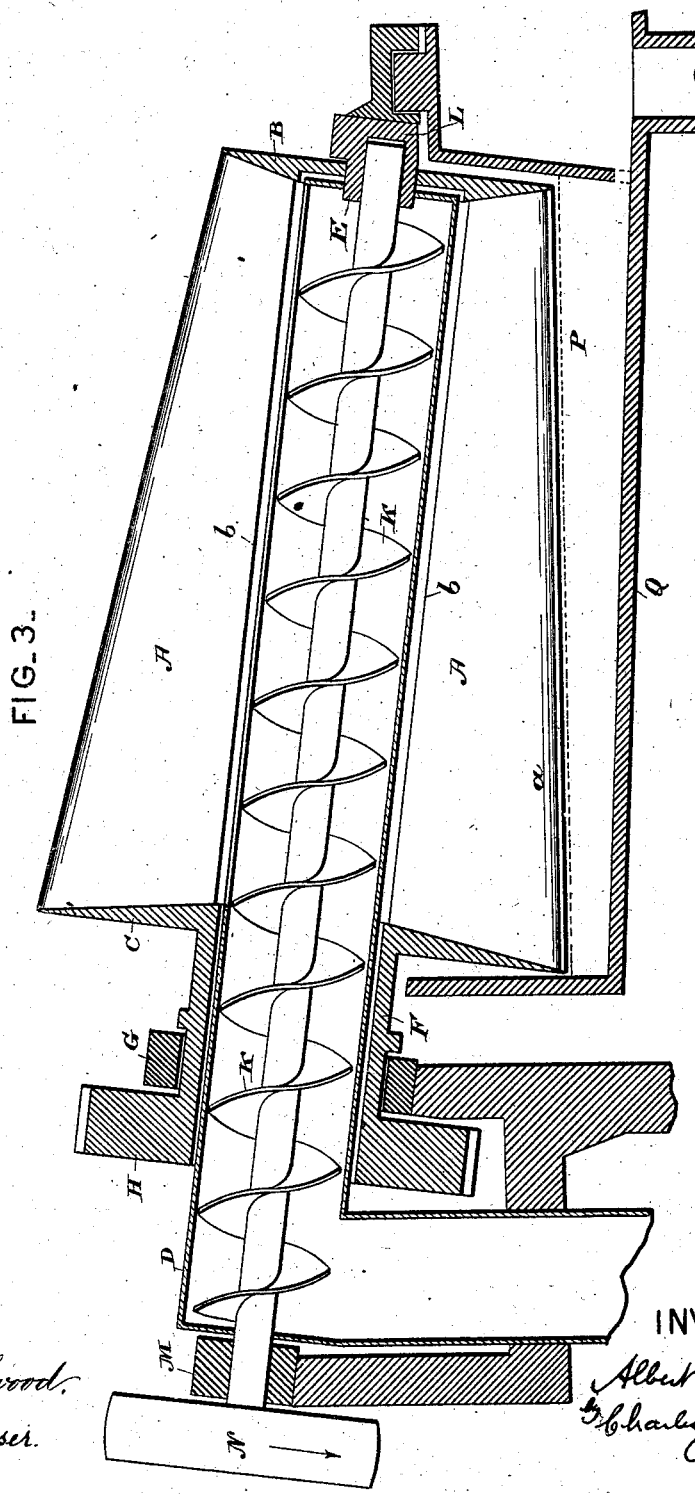

UNITED STATES PATENT OFFICE.

ALBERT P. MASSEY, OF CLEVELAND, OHIO, ASSIGNOR TO THE AMERICAN SEED OIL COMPANY, OF SAME PLACE.

APPARATUS FOR USE IN THE EXTRACTION OF OIL FROM SEEDS, &c.

SPECIFICATION forming part of Letters Patent No. 290,083, dated December 11, 1883.

Application filed November 5, 1883. (No model.)

*To all whom it may concern:*

Be it known that I, ALBERT P. MASSEY, a citizen of the United States, residing at Cleveland, in the county of Cuyahoga and State of Ohio, have invented certain new and useful Improvements in Automatic Scoops and Conveying Apparatus for Use in the Extraction of Oils from Seeds and for other Purposes, of which the following specification is a full, clear, and exact description.

The invention has reference more particularly to means for use in the extraction of oil from seeds by solvents, for removing the seed-meal from the moving porous diaphragm or strainer of the percolator, and conveying or delivering it out of said percolator after the oil has been extracted by the solvent distributed over the seed-meal supported thereon, (see Patent No. 275,989, granted to F. X. Byerley, April 17, 1883;) but it is applicable to the removal of the extracted meal, or of other substances, from any moving platform, and in part to the removal and conveyance of materials generally, as well semi-liquids as dry substances.

It consists in an automatic scoop composed of one or more wings or lifting plates, which turn or move in a circular arc, in combination with a conveying tube, trough, or chute arranged at or near the axis, about which the said wings or plates turn, so that the seed-meal or other material gathered and lifted up by the wings or plates will, when the latter are raised sufficiently high, slide over the inner edge of the said plates (or edge nearest the axis) into the said tube, trough, or chute.

It is evident that the essential features of this apparatus may be embodied in a variety of forms. It is preferred (1) to use a series of wings or lifting-plates and connect them with a common revolving support, so that the scoop may be turned continuously in one direction, and the wings or lifting-plates be brought successively into action to scoop up, lift, and deliver the material into a central conveying tube, trough, or chute, and (2) to place in or combine with the conveying tube, trough, or chute an endless screw or other well-known or suitable form of moving conveyer. These arrangements, and the use of them in connection with each other, constitute special improvements. By these means the meal or other material may be delivered into any suitable receptacle after being conveyed as far as may be desired.

The invention further consists in the combination of the automatic scoop and the conveying tube or trough with the traveling diaphragm or strainer of a percolator, or with any moving platform, so that the said diaphragm, strainer, or platform will be relieved thereby of its load. The wings or lifting-plates, in scooping, move in the opposite direction to the travel of the material.

The invention also comprises certain special constructions, as hereinafter explained.

The principle of the invention having been set forth, the best mode contemplated of applying the same will now be described with the aid of the accompanying drawings, which form a part of this specification.

Fig. 1 is a partial view of apparatus constructed in accordance with the invention in vertical section through the scoop transverse to the axis thereof, and Figs. 2 and 3 partial views in vertical section through the axis of the scoop.

The apparatus in Figs. 2 and 3 differ slightly from each other; but Fig. 1 may be considered a sectional view of either.

The scoop consists of a series of wings or lifting-plates, A, attached to and between the heads B C, which heads they serve to connect together. The wings or lifting-plates are preferably of sheet metal, and are riveted to the heads. At their outer edges they are bent into scoop shape, as shown at *a*, the rest being flat. As shown, (see Fig. 1,) they are radially disposed with reference to the axis of the device. They terminate at a suitable distance from the said axis, so as to leave space between their inner edges, *b*, for the conveying-tube D. The head B is supported upon a stationary boss, E, constituting a journal therefor. The head C is provided with a tubular journal, F, which is supported in a stationary journal block or bearing, G. A gear, H, fixed on the journal, serves to impart rotation to the scoop in the direction of the arrow, Fig. 1. The conveying-tube D occupies the central space between the wings or lifting-plates A. It extends through the opening in the journal F.

It does not rotate, and is supported at the inner end upon the boss E and at the outer end by a stationary support. The part of the tube inside the wings or lifting-plates A has the top for about a third of the periphery removed, as shown at c, Fig. 1.

Inside of the central conveying-tube D is a screw-conveyer, K. The shaft of this conveyer is journaled at its inner end in the boss E and bearing-block L, to which the said boss is attached. Near its outer end it passes out of the tube D and is journaled in the stationary block or bearing M. It carries a belt-pulley, N, for revolving it in the direction for removing the material from the tube.

As shown, the scoop is supported above and in close proximity to a traveling strainer, P, of porous material, supported and revolved in any ordinary or suitable way in or with the inclosing-case Q.

In Fig. 2 the strainer is in the form of an endless belt, and revolves independently of the containing-case, while in Fig. 3 it constitutes a false bottom to a revolving pan, as described in the patent before referred to.

In Fig. 2, as the scoop has to remove the same bulk of material from every part of the strainer, the wings or lifting-plates are of the same width throughout; but in Fig. 3, as they have to remove more material at the circumference than at the center, they are widest there. Thus in one case the scoop is cylindrical, in the other frusto-conical; and the center conveying-tube, which in the former is horizontal, is in the latter inclined upward toward the outlet.

The operation will be readily understood. The scoop is revolved at a speed corresponding to the movement of the strainer P, (which is very slow in extracting oil,) and in the opposite direction to the movement thereof, as indicated by the arrows in Fig. 1. As the material comes within reach of the wings or lifting-plates A, the scoop-shaped portions a take in each a small quantity and carry it up. After reaching a proper angle above the level of the scoop's axis, the material slides across the flat portions of the wings or plates and empties itself into the central conveying-tube, whence it is removed by the screw within.

The rotation being slow, centrifugal force has little or no effect upon the material. In cases where a quicker revolution is desired, it may be advantageous to modify the shape of the wings or lifting-plates. If it be not desired to use a screw or its equivalent inside the central conveying-tube, the latter may be inclined, so as to deliver the material be gravity. For this purpose the strainer may be inclined or the scoop may be made tapering toward the delivering side instead of toward the inner end, as shown in Fig. 3; or both these means may be used.

It is evident that parts of the invention may be used separately as well as that modifications may be made in details.

The central conveying-tube may be regarded as a covered trough, and it is evident that an uncovered one may be used.

I claim the new improvement herein described, all and several, to wit:

1. A scoop and conveying apparatus comprising one or more wings or lifting-plates turning about an axis, in combination with a tube or trough arranged near the said axis, so that the material scooped up is delivered into said trough or tube, substantially as described.

2. A revolving scoop, comprising a series of wings or lifting-plates, in combination with a central conveying trough or tube, into which said wings or lifting-plates deliver the material, substantially as described.

3. The scoop, having one or more wings or lifting-plates, in combination with the conveying tube or trough, and the screw or moving conveyer therein, substantially as described.

4. The revolving scoop, comprising a series of wings or lifting-plates, in combination with the central conveying trough or tube, and the screw or moving conveyer, substantially as described.

5. The scoop and conveying trough or tube, in combination with a traveling platform from which the material is removed by said scoop, substantially as described.

6. The scoop and conveying trough or tube, in combination with the traveling strainer of a percolator, substantially as described.

7. The revolving scoop, having one or more flat wings or lifting-plates, scoop-shaped at the outer edge, substantially as described.

8. The frusto-conical scoop, in combination with a revolving platform or pan and strainer, from which the material is removed by said scoop, substantially as described.

In testimony whereof I affix my signature in presence of two witnesses.

ALBERT P. MASSEY.

Witnesses:
 JAMES NADE,
 CHAS. T. CARRUTH.